106. COMPOSITIONS, COATING OR PLASTIC

Patented Nov. 19, 1946

2,411,213

UNITED STATES PATENT OFFICE 2,411,213

NONSLIP CEMENTITIOUS COMPOSITION AND ARTICLE

Dana B. Johannes, Jr., Silver Spring, Md., assignor to International Products Company, Washington, D. C.

No Drawing. Application June 24, 1944, Serial No. 542,010

4 Claims. (Cl. 106—36)

This invention relates to the production of certain non-slip, low moisture absorption and high strength cementitious compositions for the manufacture of tile and other building materials.

The invention broadly embraces a composition comprising a mixture of cementitious materials, an aggregate material and a waterproofing material. More particularly, the invention includes the formation of a waterproof non-slip article by curing an aqueous composition comprising powdered coquina and cement as the cementitious materials, aluminum oxide or other suitable aggregate as abrasives, and a mixture of finely ground calcium stearate and a finely ground hydrous aluminum silicate, as the waterproofing material, wherein the hydrous aluminum silicate, in finely ground form serves also as a filler and a lubricating agent.

I have found that a proper blend of powdered coquina, in proportions preferably not less than 50% by weight of the total composition, minor amounts of cement, generally less than 20% by weight, a suitable aggregate, preferably aluminum oxide abrasives, and a waterproofing agent and filler such as a mixture of calcium stearate and hydrous aluminum silicate, provide a superior product, which when properly cured provides an excellent waterproof, non-slip article.

One of the objects of the invention is to provide a waterproofing material for addition to a cementitious-aggregate mix, comprising calcium stearate and a hydrous aluminum silicate.

Another object of the invention is to provide in a composition, the combination of a cementitious material including powdered coquina, an aggregate and preformed calcium stearate in conjunction with hydrous aluminum silicate.

Still another object of my invention is the production of a composition to be used for the manufacture of tile, cove base, safety treads, shower curbs, thresholds, and for similar purposes, which are impervious to water, and of high strength and having a non-slip surface. More specifically, the object is to produce a non-slip tile and other articles that will develop a coefficient of static friction on leather or rubber, whether wet or dry, ranging from 0.50 to 0.70, and on oily surfaces of not less than 0.20; and a coefficient of sliding friction for leather and rubber, wet or dry, of from 0.40 to 0.70 and on oily surfaces of not less than .08.

Such tile and other articles may be manufactured by using materials preferably in the following proportions: not less than 50 lbs. of powdered coquina, screened so that not more than five (5) percent will be retained on a 40 mesh screen, mixed with not less than ten (10) nor more than twenty (20) per cent cement (High Early, Lumnite, standard Portland or white), using not less than one (1) pound of compound of a mixture of pre-formed calcium stearate and hydrous aluminum silicate e. g. agalmatolite of the following composition: $H_2Al_2(SiO_3)_4$; $H_2O$—5 percent, $Al_2O_3$—28.3 percent; and $SiO_2$—66.7 percent, and still further mixed with aluminum oxide abrasives of no coarser size than will pass entirely on a No. 60 mesh screen, which shall be used in quantities of not less than fifteen (15), nor more than thirty-six (36) percent by weight.

My composition comprises essentially a mixture of powdered coquina, cement, and aluminum oxide abrasives, to which has been added a small quantity of a mixture consisting of preformed calcium stearate and a hydrous aluminum silicate.

As an example, my invention consists in mixing in a small size concrete or mortar mixer, 50 pounds of powdered coquina, passing a No. 50 mesh screen, with 13 pounds of cement (High Early, Lumnite, standard Portland, or white), 36 pounds of aluminum oxide abrasives passing a No. 60 mesh screen, and one pound of preformed calcium stearate to which has been added an hydrous aluminum silicate ground from 140 to 750 mesh, the latter material being added to to the mixing water before being mixed with the mass of cementitious and aggregate materials. The mass mix is mixed not less than five minutes at not less than 20 R. P. M. After thoroughly mixing, the material is poured in tile, safety tread, cove base, shower curb, or threshold molds, of varying sizes and thicknesses; and then cured either by placing same in humidity controlled rooms, or by hydraulic pressure. After properly curing, the material is run through acid vats to remove the scum from the faces thereof, which may also be done by placing same on rubbing beds. Safety treads and thresholds, in addition to being manufactured in various shapes, widths and lengths, are reinforced by brass or steel rods, and have notchings on the back and underside to provide additional anchorage.

This combination of materials, when mixed as above described, produces a mineral aggregate material having compression strength of not less than 8,000 pounds per square inch per inch of thickness, not more than two (2) percent moisture absorption, with coefficient or static and sliding friction as indicated hereinbefore.

Slight variations in the preferred weights of the several materials will not change the factor values.

The example given is only for the purpose of illustrating the invention and my invention embraces any waterproof composition in which an intimate mixture of calcium stearate and hydrous aluminum silicate is employed as an additive to a binder-aggregate mixture, particularly where the binder includes powdered coquina preferably in a major amount, and more specifically this invention covers a non-slip, waterproof article formed by suitably curing an aqueous mixture of the ingredients set forth above.

The term pre-formed calcium stearate is intended to include substantially pure calcium stearate preferably made in accordance with the method set forth in my co-pending application.

It will be understood that I desire to comprehend within my invention such modifications as may be clearly embraced in my claims and within the scope of my invention.

What I claim is:

1. A waterproof cementitious composition comprising 50 pounds powdered coquina, 13 pounds Portland cement, 36 pounds aluminum oxide abrasives, and 1 pound of a powdered mixture of calcium stearate and hydrous aluminum silicate.

2. A waterproof cementitious composition comprising no less than 50 pounds of powdered coquina of such particle size that not more than five percent will be retained on a 40 mesh screen, 10–20 percent of Portland cement based on the total weight of the composition, 15–36 percent of aluminum oxide abrasives based on the total weight of the composition and of such a particle size that all particles will pass a 60 mesh screen, and 1 pound of a powdered mixture of calcium stearate and hydrous aluminum silicate.

3. A non-slip waterproof article formed by curing an aqueous mixture of ingredients comprising a major part by weight of powdered coquina of such particle size that not more than five percent will be retained on a 40 mesh screen, 10–20 percent by weight of Portland cement, 15–36 percent by weight of aluminum oxide abrasives of such particle size that all particles will pass a 60 mesh screen, and approximately 1 percent by weight of a powdered mixture of calcium stearate and hydrous aluminum silicate, said article being characterized by having a coefficient of static friction on leather or rubber ranging from 0.5–0.7 and a coefficient of sliding friction for leather or rubber ranging from 0.4–0.7.

4. A non-slip waterproof article formed by curing an aqueous mixture of 50 pounds powdered coquina, 13 pounds Portland cement, 36 pounds aluminum oxide abrasives, and 1 pound of a powdered mixture of calcium stearate and hydrous aluminum silicate, said article being characterized by having a coefficient of static friction on leather or rubber ranging from .015–0.7 and a coefficient of sliding friction for leather or rubber ranging from .014–0.7.

DANA B. JOHANNES, JR.